United States Patent

[11] 3,620,912

[72] Inventors Andrew Beelik
Shelton;
Jim D. Wilson, Olympia, both of Wash.
[21] Appl. No. 812,340
[22] Filed Apr. 1, 1969
[45] Patented Nov. 16, 1971
[73] Assignee International Telephone and Telegraph Corp.
New York, N.Y.

[54] MERCERIZATION OF CELLULOSIC MATERIALS USING A SOLUTION CONTAINING A MERCERIZING CONCENTRATION OF ALKALI AND A BARIUM COMPOUND
9 Claims, No Drawings

[52] U.S. Cl. ..................................................... 162/90, 8/125
[51] Int. Cl. ..................................................... D21c 3/02
[50] Field of Search........................................... 8/125; 162/70, 90

[56] References Cited
UNITED STATES PATENTS
1,392,833  10/1921  Jones et al. ................... 8/125

OTHER REFERENCES
Marsh, Mercerizing, " Absorption of Dilute Alkali," 1942, p. 405–406.
Beelik et al., " Selective Extraction of Hemicelluloses From Softwoods," TAPPI Journal, Vol. 50, No. 2, February 1967, pgs. 78–81.

Primary Examiner—S. Leon Bashore
Assistant Examiner—Arthur L. Corbin
Attorneys—C. Cornell Remsen, Jr., Walter J. Baum, Percy P. Lantzy, J. Warren Whitesel, Delbert P. Warner and James B. Raden ABSTRACT: A minor amount of barium compound is incorporated in a mercerizing concentration of alkali to form a solution. A cellulosic material is treated with this solution to produce a high yield of mercerized product. This product contains a substantial amount of alkali-soluble, short-chain polysaccharides.

MERCERIZATION OF CELLULOSIC MATERIALS USING A SOLUTION CONTAINING A MERCERIZING CONCENTRATION OF ALKALI AND A BARIUM COMPOUND

The present invention relates to new and improved mercerization methods and to the products prepared thereby. More particularly, it relates to methods for preparing new and improved mercerized cellulose products containing substantial amounts of alkali-soluble, short-chain polysaccharides and to the products prepared thereby.

Throughout this specification, the term "mercerization" is used to denote the well-known treatment of cellulosic materials with aqueous solutions of caustic alkalies. These caustic alkali solutions are concentrated sufficiently to cause extensive swelling of the cellulose and substantial changes in the physical structure of the cellulose. Among the changed physical properties which are exhibited by cellulosic materials treated in this manner are a reduction in density (increase in bulk) and increased porosity.

Cellulosic materials exhibiting the above-described properties of increased bulk and porosity are very desirable for certain applications. For example, it is desirable for paper pulps to be utilized for impregnation with elastomers in the manufacture of artificial leather and the like to have these properties. Also, it is desirable for certain specialty papers to exhibit these properties.

However, the mercerization treatment has certain inherent disadvantages. The swelling of the cellulose caused by mercerization increases the accessibility of certain short-chain polysaccharides (hemicelluloses and low D.P. celluloses) present in the native cellulose. Thus, heretofore, substantial amounts of these short-chain polysaccharides have been removed during mercerization. The removal of these constituents may actually be advantageous in the production of certain types of mercerized wood celluloses, such as dissolving pulps. However, the removal of these short-chain polysaccharides is very undesirable in other instances.

For example, paper pulps are treated with mercerizing solutions primarily for the purpose of lowering density and increasing bulk. In the production of these mercerized paper pulps. the removal of hemicelluloses and low D.P. celluloses merely causes a highly undesirable reduction in product yield Additionally, hemicelluloses generally improve the bonding properties of wood pulps. Consequently, the removal of the hemicelluloses during the mercerization treatment causes an undesirable reduction in the bonding qualities of the pulp fibers.

It would, therefore, be highly desirable and economically advantageous to provide a new and improved method for mercerizing cellulosic materials such as paper pulps which would allow for the retention of a substantial percentage of short-chain polysaccharides in the product. The resulting product would also be of great value, for example, in the production of artificial leather and for specialty papers.

It is, therefore, an object of the present invention to provide a new and improved method for mercerizing native cellulose wherein alkali-soluble, short-chain polysaccharides are retained in the mercerized product.

Another object is to provide new and improved mercerized cellulosic products containing substantial amounts of alkali-soluble, short-chain polysaccarides.

A further object is to provide a new and improved method for mercerizing native cellulose whereby substantially increased yields of mercerized product are obtained.

Additional objects, if not specifically set forth herein, will be apparent to one skilled in the art from the following detailed description of the invention.

Generally, the method of the present invention comprises adding a minor amount of a barium compound such as barium hydroxide, barium chloride, barium acetate, barium sulfide and the like and mixtures thereof to a standard aqueous alkali mercerizing solution such as sodium hydroxide, potassium hydroxide, lithium hydroxide and the like. This solution is then employed to mercerize a cellulosic material such as bleached or unbleached wood pulp, cotton yarn or cloth and the like by known cold caustic refining techniques.

In the cold caustic treatment of wood pulp and other types of cellulosic materials, mercerization normally starts at a caustic soda concentration of about 5 to 7 percent at room temperature and will be substantially complete at about 9 to 12 percent. Experience has shown that the most effective action is attained with from about 8 to 14 percent caustic soda present based on the weight of the solution. These percentages can be raised and lowered somewhat by variations in origin of the and by variations in temperature. Normally, mercerization increases with rising concentration and decreases with rising temperature and vice versa. Therefore, as the temperature of the solution is raised the caustic soda concentration in the mercerizing solution must also be raised to obtain an equivalent effect on the cellulosic material being treated. On the whole, however, the foregoing range holds very well for normal cold caustic soda treatment presently employed.

Barium hydroxide has previously been employed in an experimental procedure for the selective extraction of hemicelluloses (e.g. *The Journal of the Technical Association of the Pulp and Paper Industry*, Vol. 50, No. 2, Feb. 1967 article coauthored by one of the present inventors). However, the purpose therein was to obtain separated and purified hemicellulose fractions, and not the preparation of mercerized cellulose products. Additionally, heretofore, it has been thought to be essential to preliminarily impregnate the cellulosic material with barium hydroxide since the addition of the insolubilizing agent directly to the extraction liquor gave inferior results.

More specifically, the present invention is based on our discovery that the single-step treatment of cellulosic materials with a solution comprising a minor amount of a barium compound such as barium hydroxide, barium chloride, barium acetate, barium sulfide and the like and mixtures thereof and a mercerizing concentration of alkali will provide new and improved mercerized products containing substantial amounts of alkali-soluble, short-chain polysaccharides in substantially greater yields than have been achieved heretofore.

The concentration of barium compound to be incorporated into the mercerizing solution has been found to be in the range of from about 0.10 percent to about 3 percent based on the weight of the solution, and preferably in the range of from about 0.5 percent to about 1.5 percent. However, it must be noted that the amount of barium compound to be used in a given process will be dependent to a degree on the temperature of the solution and the concentration of caustic soda employed since the barium compound solubility is sensitive to these two factors.

For example, at a solution temperature of 25° C. only about 0.6 percent barium hydroxide will normally dissolve in a 9 percent aqueous sodium hydroxide solution. Therefore, at this temperature and with this concentration of caustic soda it would not be practical on a production scale to use levels greater than about 0.6 percent barium hydroxide; although, it would be possible to use higher concentrations of barium hydroxide if the mercerizing solution was supersaturated with barium hydroxide. At higher temperatures, of course, higher concentrations of barium hydroxide may practically be employed. In a pulp mill, mercerization is usually performed at about 30°-50° C. using about 9-11 percent sodium hydroxide, under these conditions it would be feasible to use higher concentrations of barium hydroxide, e.g., 1.5 percent.

It has been found that the process of this invention may best be carried out in a temperature range of from about 5° C. to about 60° C., in a aqueous caustic solution containing a minor amount of barium compound and a mercerizing concentration of alkali. Preferably, the barium compound concentration in the caustic solution should be in the range of from about 0.10 percent to about 3.0 percent by weight and the alkali concentration should be about 5–18 percent by weight.

the following examples are set forth for the purpose of illustrating the method of this invention and the characteristics of the resulting products only and are not intended to be construed as being limitative in any respect.

EXAMPLE I

A supply of fully bleached, never dried hemlock sulfite paper pulp was divided into several discrete portions. One portion was used as a control. This control portion was not treated with caustic soda and consequently represents an unmercerized sample. A second portion was mercerized under conditions known to impart desirable mercerized pulp properties. This second portion was treated with 9 percent (weight of solution basis) sodium hydroxide solution at 25° C., but no barium hydroxide was incorporated into the mercerizing liquor. A third portion of pulp was treated with a solution containing 1.0 percent barium hydroxide and 9 percent sodium hydroxide (solution basis). Since barium hydroxide absorbed atmospheric carbon dioxide so readily that dissolution of the solid hydroxide in water gave cloudy solutions containing precipitated barium carbonate, the barium hydroxide was added to the mercerizing solution, in each case herein, as a near-saturated solution (about 3.5 percent) that had stood until all the precipitated barium carbonate had settled. The liquid components were mixed together prior to treatment of the pulp. Mercerization was performed, as above at 25° C. Four more portions of pulp were mercerized in the same manner as above except that the amount of barium hydroxide introduced into the mercerizing solution was varied in each case so that the solutions contained 0.75 percent, 0.5 percent, 0.25 percent and 0.15 percent (solution basis) concentrations of barium hydroxide respectively.

The yield of mercerized product was then determined for the portions and the percentage yield on an ash-free basis was calculated. The percentage of increased yield was determined for the mercerized products prepared by treatment with barium hydroxide over the mercerized product which had not been treated with barium hydroxide.

Additionally, various standard tests were made on the foregoing pulp samples after they had been treated as indicated. A determination was made of the $S_{10}$ and $S_{18}$ values of the samples by a method similar to TAPPI Standard T235m—60. The $S_{10}$ test determines the solubility of pulp products in D.P. 10 percent sodium hydroxide solution and gives an indication of the short-chain polysaccharide content (i.e., hemicelluloses and low D.P. celluloses) of a pulp sample. The $S_{18}$ test determines the solubility of pulp products in 18 percent sodium hydroxide and gives an indication of the hemicellulose content of a pulp sample. Also, a determination was made of the mannan values of the samples by the test procedures of Jeffery et al., Analytical Chemistry, 32, 1774-7 (Dec., 1960). The mannan test is a measure of the predominant hemicelluloses (i.e. the glucommannans) present in the samples.

The results of this testing are tabulated in the following table:

TABLE I

| Mercerization NaOH, percent | Solution Ba(OH)$_2$, percent | Yield of mercerized product (ash-free basis) percent | Yield increase,* percent | $S_{10}$, percent | $S_{18}$, percent | Mannan, percent |
|---|---|---|---|---|---|---|
| 0.0 | 0.0 | Control | | 13.0 | 11.1 | 5.9 |
| 9.0 | | 88.0 | | 2.4 | 2.6 | 1.8 |
| 9.0 | 1.0 | 94.8 | 7.7 | 7.6 | 7.3 | 5.9 |
| 9.0 | 0.75 | 94.2 | 7.0 | 6.8 | 6.5 | 5.3 |
| 9.0 | 0.50 | 92.2 | 4.8 | 7.1 | 5.7 | 4.1 |
| 9.0 | 0.25 | 90.2 | 2.5 | 4.6 | 3.6 | 2.8 |
| 9.0 | 0.15 | 90.0 | 2.3 | 4.4 | 3.2 | 2.5 |

*Increase in yield expressed as percent increase over 88% yield of conventionally mercerized product (i.e. no barium hydroxide treatment).

As indicated in the table above, conventional mercerization (i.e., without barium hydroxide) was accompanied by a substantial loss of pulp and, consequently, a large reduction in yield of mercerized pulp product. This reduced yield can be attributed to the removal of the hemicelluloses and degraded or low D.P. cellulose as indicated by the substantial drop in $S_{10}$, $S_{18}$ and mannan values. The addition of barium hydroxide was shown to reduce the loss of pulp during mercerization and, consequently, to substantially increase the yield of mercerized product. These increased yields result from the reduction in the amount of hemicellulose and low D.P. cellulose dissolved out of the pulp during mercerization. The increased $S_{10}$, $S_{18}$ and mannan values for the pulps mercerized with barium hydroxide addition indicate this increased retention of short-chain polysaccharides as compared with pulps treated in the conventional manner.

EXAMPLE II

Another standard test was performed with each of the seven portions of hemlock sulfite paper pulp preparation in example I. In this test, a determination was made of the limit intrinsic viscosity or "limit I.V.'s" of each of the portions. This test affords a sensitive and accurate method for detecting mercerization since the limit I.V. of a cellulosic material is sharply lowered by mercerization. Consequently, this test was conducted to determine the effect that the introduction of barium hydroxide into the mercerizing solution had on the the mercerization of these pulp samples.

In determining the limit I.V. for these samples, 0.3 grams of the pulp was osterized (ground to a fine particle size) and then hydrolyzed for 35 minutes in 75 mls. of 2.0 N HCl at 100° C. The sample was then filtered, washed with water and methonal and dried at 115° C. THe limit I.V. was then determined by a standard method similar to that described by the Scandanavian pulp paper and board testing committee SCAN-C15:62.

The results of this testing are tabulated in the following table

TABLE II

| Mercerizing Solution | | Limit I.V. |
|---|---|---|
| NaOH% | Ba(OH)$_2$% | *dl./g. |
| 0.0 | 0.0 | 1.70 |
| 9.0 | 0.0 | 0.76 |
| 9.0 | 1.0 | 0.80 |
| 9.0 | 0.75 | 0.83 |
| 9.0 | 0.50 | 0.87 |
| 9.0 | 0.25 | 0.86 |
| 9.0 | 0.15 | 0.97 |

*Limit I.V. is limit intrinsic viscosity in deciliters/gram (dl./g.).

From the foregoing results it is apparent that the addition of barium hydroxide to the mercerizing solution had very little effect on the mercerization of the product. Thus, it has been shown that the yield benefits derived from this invention have been accomplished without interfering with mercerization.

EXAMPLE III

A supply of fully bleached, never dried southern pine conventional kraft pulp was divided into five separate portions. These portions were treated in the same manner as were the samples in example I. One portion was mercerized with 9 percent (solution basis) sodium hydroxide at 25° C., and used as a control. The four other portions were treated with previously prepared solutions each containing sodium hydroxide and barium hydroxide at 25° C. The concentration of sodium hydroxide in each of these four solutions was 9 percent (solution basis), while the concentration of barium hydroxide in the four solutions was 1.5 percent, 1.0 percent, 0.75 percent and 0.5 percent (solution basis) respectively. These four solutions were prepared in the same manner as the solutions of example I were prepared.

The yield of mercerized product was then determined for each of the portions and the percentage yield on an ash-free basis was calculated. The following table gives the results of this testing which clearly shows the substantial increase in yield achieved by introducing barium hydroxide into the mercerizing solution:

TABLE III

| Mercerizing NaOH, percent | Solution Ba(OH)$_2$, percent | Percent yield mercerized product (ash free basis) | Increased yield over control,[1] percent |
| --- | --- | --- | --- |
| 9.0 | [2] 0.0 | 87.8 | |
| 9.0 | 1.5 | 92.3 | 5.1 |
| 9.0 | 1.0 | 93.5 | 6.5 |
| 9.0 | 0.75 | 92.5 | 5.4 |
| 9.0 | 0.5 | 91.9 | 4.7 |

[1] Increase in yield expressed as a percent increase over the 87.8 percent yield of the control.
[2] Control.

EXAMPLE IV

Each of the five mercerized portions of southern pine conventional kraft pulp prepared in example III were subjected to the "limit I.V. " test in the same manner as described in example II. An unmercerized sample of southern pine conventional kraft pulp was introduced into this testing as a sixth sample for the purpose of providing a standard for the "limit I.V." test.

The results of this testing are tabulated in the following table:

TABLE IV

| Mercerizing Solution | | |
| --- | --- | --- |
| NaOH % | Ba(OH)$_2$ % | Limit I.V. *dl./g. |
| 0.0 | 0.0 | 1.45 (Untreated Pulp) |
| 9.0 | 0.0 (control) | 0.74 |
| 9.0 | 1.5 | 0.78 |
| 9.0 | 1.0 | 0.76 |
| 9.0 | 0.75 | 0.81 |
| 9.0 | 0.50 | 0.80 |

* deciliters/gram

From the foregoing results it is apparent that the addition of barium hydroxide to the mercerizing solution had very little effect on the mercerization of the product. Thus, it was shown that the yield benefits derived by the process of this invention have been accomplished without interfering with mercerization.

EXAMPLE V

A supply of unbleached southern pine conventional kraft pulp of a type commonly processed into a commercial grade of mercerized paper pulp was bleached by a sequence including chlorination, washing, hot dilute caustic soda extraction, washing, chlorine dioxide treatment and washing. This bleaching operation was carried out on a semiworks scale to a degree such that the pulp was ready to be mercerized. The properties of pulp treated in this manner are indicated in the following table (table V) under the heading "Pulp Before Mercerization."

A sample of bleached southern pine conventional kraft pulp was then divided into two discrete portions. One of the portions was mercerized by conventional techniques. The other portion was mercerized in the same manner except that barium hydroxide was added to the mercerizing solution.

For mercerization with barium addition, the never dried pulp (7.7 kg. wet, 2.8 kg. dry basis) was added to a 40° C. mixture of water, aqueous 3.5 percent barium hydroxide solution and 18.5 percent sodium hydroxide solution to give a 3 percent consistency slurry in a solution containing 9 percent sodium hydroxide and 1 percent barium hydroxide. The slurry was maintained at 40° C. for 15 minutes, with constant agitation. Then, the slurry was transferred to a centrifuge and the liquor removed. Part of this liquor was used to wash any remaining pulp out of the mercerizing tank. The unwashed pulp cake was then reslurried (2.0 percent –2.5 percent consistency) in water-made acid with sulfur dioxide (ph 3) and agitated at room temperature for 10 minutes. It was then recentrifuged and washed with deionized water to give the finished mercerized product.

The other portion of bleached pulp was mercerized in the same manner except that that barium hydroxide was not included in the mercerized solution. This portion was employed as a control.

The following table gives the results of various standard tests made on the foregoing pulp samples after they had been treated as indicated and on sheets formed with this pulp. In order to form these test she sheets, the pulp samples were dried, reslurried and formed into sheets on a TAPPI sheet mold.

TABLE V

| | Pulp before mercerization | Pulp mercerized without Ba(OH)$_2$ | Pulp mercerized with Ba(OH)$_2$ |
| --- | --- | --- | --- |
| Yield: | | | |
| Yield (percent) | 100.0 | 89.1 | 92.5 |
| Increased yield (percent)* | 0.0 | 0.0 | 3.8 |
| Pulp properties: | | | |
| S$_{10}$ (percent) | 14.70 | 3.74 | 6.72 |
| S$_{18}$ (percent) | 13.97 | 3.48 | 5.71 |
| Limit I.V. (dl./g.) | 1.51 | 0.94 | 0.92 |
| Xylan (percent) | 9.1 | 1.8 | 2.1 |
| Mannan (percent) | 7.0 | 4.9 | 7.2 |
| Sheet properties: | | | |
| Density (g./cm.) | 0.44 | 0.31 | 0.35 |
| Air permeability (c.f.m.) | 20 | 98 | 73 |

*Increase in yield expressed as a precent increase over the 89.1 percent yield of the control.

EXAMPLE VI

A supply of partially bleached southern pine conventional kraft pulp was divided into three equal portions. Each of the portions was mercerized according to the general procedure of example I except that the mercerizing temperature was raised to 40° C.

The first portion of pulp was mercerized by conventional means with 9 percent sodium hydroxide as a control. The yield of mercerized pulp product obtained was 87.6 percent.

The second portion of pulp was mercerized in the same manner as the first except that barium chloride (equivalent to 1 percent barium hydroxide) was dissolved in the 9 percent sodium hydroxide mercerizing solution prior to mercerization treatment of the pulp. The yield of mercerized pulp product in this instance was 90.9 percent. This was an increase of 3.8 percent of the control portion.

The third portion of pulp was mercerized in the same manner as the first except that barium acetate (equivalent to 1 percent barium hydroxide) was dissolved in the 9 percent sodium hydroxide mercerizing solution prior to mercerization of the pulp. The yield of mercerized product was 92.6 percent. This was an increase of 5.7 percent over the control portion.

While the principles of the invention have been described above in connection with specific apparatus and applications, it is to be understood that this description is made only by way of example and not as a limitation on the scope of the invention.

We claim:

1. A process for producing a high yield of mercerized wood pulp comprising: preparing an aqueous solution including a minor amount of a barium compound and a mercerizing concentration of alkali and treating said wood pulp with said solution at a temperature of from about 5°–60° C.

2. The process of claim 1 wherein the barium compound is selected from the group consisting of barium hydroxide, barium chloride, barium acetate, barium sulfide and mixtures thereof.

3. The process of claim 1 wherein said solution contains between about 0.10 percent and 3 percent by weight barium compound and between about 5 percent and 18 percent by weight alkali.

4. The process of claim 1 wherein the temperature is from about 25°–40° C.

5. A process for preparing mercerized products containing a substantial amount of alkali-soluble short-chain polysaccharides comprising treating a cellulosic material in a single step with an aqueous caustic solution containing a minor amount of a barium compound and a mercerizing concentration of alkali.

6. The process of claim 5 wherein said barium compound is selected from the group consisting of barium hydroxide, barium chloride, barium acetate, barium sulfide and mixtures thereof.

7. The process of claim 5 wherein said solution comprises between about 0.10 percent and 3 percent by weight barium hydroxide and between about 5 percent and 18 percent by weight alkali.

8. The process of claim 7 wherein said cellulosic material is paper pulp.

9. The mercerized product prepared by the process of claim 5.

* * * * *